United States Patent [19]
Koelle

[11] Patent Number: 5,479,160
[45] Date of Patent: Dec. 26, 1995

US005479160A

[54] LOW LEVEL RF THRESHOLD DETECTOR

[75] Inventor: Alfred R. Koelle, Santa Fe, N.M.

[73] Assignee: Amtech Corporation, Dallas, Tex.

[21] Appl. No.: 130,630

[22] Filed: Oct. 1, 1993

[51] Int. Cl.⁶ ..................................................... H04B 1/22
[52] U.S. Cl. ...................... 340/825.70; 455/343; 455/296
[58] Field of Search .................. 340/825.70, 825.54,
340/825.69, 825.59; 455/343, 38.2, 38.3,
214, 263, 280, 337, 296; 329/346

[56] References Cited

U.S. PATENT DOCUMENTS

| | | | |
|---|---|---|---|
| 4,135,191 | 1/1979 | Sawicki | 329/346 |
| 4,799,059 | 1/1989 | Grindahl et al. | 340/825.54 |
| 4,955,038 | 9/1990 | Lee et al. | 340/825.54 |
| 5,193,210 | 3/1993 | Nicholas et al. | 340/825.69 |

*Primary Examiner*—Michael Horabik
*Attorney, Agent, or Firm*—Roger S. Borovoy

[57] ABSTRACT

A low power circuit which detects low level RF signals and RF signals of varying strength and, upon detection, activates or "wakes up" RF equipment, such as an automatic vehicle identification tag, that is normally kept in a dormant state to conserve operating power between active operations. The circuit converts a detected RF signal from a dc voltage signal to an ac voltage signal by "chopping" the dc signal to a "chopped dc" square wave, the amplitude of which is proportional to that of the original dc signal voltage, which in turn is proportional to the level of the received RF signal. The chopped dc square wave is then linearly combined with a threshold reference level signal of opposite polarity and the combined signals form the input to an ac-coupled limiting amplifier. The polarity of the amplified signal is identical to that of the larger of its two input signals. A phase detector determines the polarity of the amplified signal. When the phase detector discerns the detected RF activation signal, it activates the RF equipment.

8 Claims, 5 Drawing Sheets

SQUARE WAVE GENERATOR  +3V / 0V

REFERENCE SIGNAL ACCROSS RESISTOR 5  +10mV / 0V

VOLTAGE ACROSS FET3 WITH 5mV DETECTED RF  +5mV

NET VOLTAGE INTO CAPACITOR 7  +10mV / +5mV

OUTPUT OF AMPLIFIER 10  +3V / 0V

AMPLIFIER 10 OUTPUT $\overline{XOR}$ed WITH SQUARE WAVE GENERATOR SIGNAL  +3V / 0V

SAMPLING PULSE TIMES

SIGNAL WAVE SHAPES WITH DETECTED RF OF 5mV, SMALLER THAN THE 10mV REFERENCE SIGNAL.

SIGNAL WAVE SHAPES WITH DETECTED RF OF 20mV, LARGER THAN THE 10mV REFERENCE SIGNAL.

LOW LEVEL RF THRESHOLD DETECTOR

This invention relates to a circuit for detecting a low level RF activation signal and, upon detection, activating or "waking up" RF equipment, such as an automatic vehicle identification tag, that is normally kept in a dormant state to conserve operating power between active operations.

BACKGROUND OF THE INVENTION AND PRIOR ART

An automatic vehicle identification (AVI) system uses RF signals to communicate information between a vehicle tag and a reader apparatus. AVI tags generally are powered by a compact and inexpensive battery and may be one of two types: "Read-Only" tags allow the reader apparatus to read information previously stored in the tag's memory, while "Read/Write" tags can also write new information into the tag's memory in response to signals from the reader. Read/Write tags are more complex than Read-Only tags and use more current during the active part of a transaction. The active state current required by the Read/Write tag usually is so high that it is impractical to power the tag continuously in its fully active state. Accordingly, it is common practice to maintain the tag in a low-current background state between transactions and activate it in response to an RF activation signal from a reader apparatus only when needed for a transaction.

The reader apparatus senses changes in RF reflectivity that result from the coded backscatter modulation signal that the tag emits. Some Read/Write tags emit this backscatter modulation signal—i.e., they continue to function in the "read" mode—while the tag logic remains in the low-current background state. For "write" functions, the Read/Write tag also must have a means for receiving a modulated RF "write data" signal from the reader and converting it by detection and amplification into a form that can be used by the tag's logic circuitry. Most tags, being aimed at low cost, use simple "direct detection" of ASK (Amplitude Shift Key) or "ON/OFF" RF signals to form a low voltage signal pulse train, whose amplitude depends on the strength of the received RF signal and is therefore of variable amplitude. This pulsed signal has to be amplified to the tag circuit's "logic level"—usually at whatever battery voltage is used in the tag, e.g., 3 volts for a lithium cell. Implementing this function is made difficult by the fact that the detected signal amplitude might vary from millivolts to volts, depending on the strength of the reader RF signal received at the tag.

In addition, tag RF detection circuits must be able to distinguish stray RF signals to prevent the tag from being activated inadvertently and to insure that unwanted data is not passed to the tag. Some existing tag systems use coded RF signals to overcome this problem. In general, however, building selectivity into the tag's RF detection circuitry increases power consumption and makes battery operation more difficult and expensive.

While there are well known means for detecting RF signals, the excessive power consumption of most such circuits makes them impractical for inclusion in a battery-operated tag. An earlier Amtech tag addressed the power consumption problem by using a high-gain bipolar transistor for threshold RF detection and signal amplification. The bipolar NPN transistor conducts at about 550 mV, yet passes almost no current until the detected RF voltage level rises to about 450 mV, making it well suited for systems with a high RF threshold level—e.g., 550 mV. However, that circuit is vulnerable to background interference from both continuous wave (cw) and modulated RF sources, and will not work in systems using low-level reader-transmitted RF signals.

Due to concerns about health risks associated with long-term exposure to RF energy, new tag systems are being designed to require very low RF threshold levels, e.g., 5mV–50 mV, requiring greater sensitivity in the tag's RF threshold detection circuit. Threshold detection of dc voltages in this range is difficult to do economically because conventional differential-amplifier input voltage comparators have an offset voltage of up to ±15 mV due to random variations in semiconductor processing, and that offset voltage tends to vary with ambient temperature. The offset voltage shifts the threshold level and sets a lower practical limit on the RF level that can be detected reliably. While there are known techniques for trimming out the offset voltage, they are expensive to implement and may not perform consistently over changing temperatures and supply voltage levels.

Additionally, the RF level received at the tag can range from 5 mV up to 1V or more, creating a risk of overload and distortion at higher signal levels. Variation in the received RF signal also makes amplifying the read/write signal to the logic level of the tag circuitry more problematic. Therefore, what is needed is a low level RF detection circuit that consumes little power and is not susceptible to background RF noise or fluctuations in the RF energy level.

BRIEF DESCRIPTION OF THE INVENTION

Briefly, the invention provides an inexpensive circuit that consumes little power, can detect low level RF signals and RF signals of varying strength, and can reject intermittent low level RF interference. The circuit of the invention receives an RF activation signal and passes it through an RF detector. The circuit also supplies a threshold reference level signal. The output of the RF detector is converted from a dc voltage signal to an ac voltage signal by "chopping" the dc signal to a "chopped dc" square wave, the amplitude of which is proportional to that of the original dc signal voltage (which in turn is proportional to the level of the received RF signal) and the polarity of which is opposite that of the threshold reference level signal. The converted output of the RF detector and the threshold reference level signal then form the input to an ac-coupled limiting amplifier.

The polarity of the signal produced by the ac-coupled limiting amplifier is identical to that of the larger of the two signals that form its input. Thus, if the chopped detected RF dc signal is larger than the threshold reference level signal, an amplified version of the detected RF signal will emerge from the amplifier. Likewise, if the threshold reference level signal is larger than the chopped detected RF dc signal, the amplifier output will be an amplified version of the threshold reference level signal.

A phase detector is then used to determine the polarity of the amplified signal. If the polarity of the amplified signal is the same as that of the detected RF activation signal (i.e., opposite to that of the threshold reference level signal), then the tag's logic circuitry is activated. In the preferred embodiment, logic circuitry is added to insure that the tag's read/write circuitry will not be activated unless the polarity of the RF activation signal is detected for a specified time.

DETAILED DESCRIPTION OF A PREFERRED EMBODIMENT OF THE INVENTION

Figure 1:
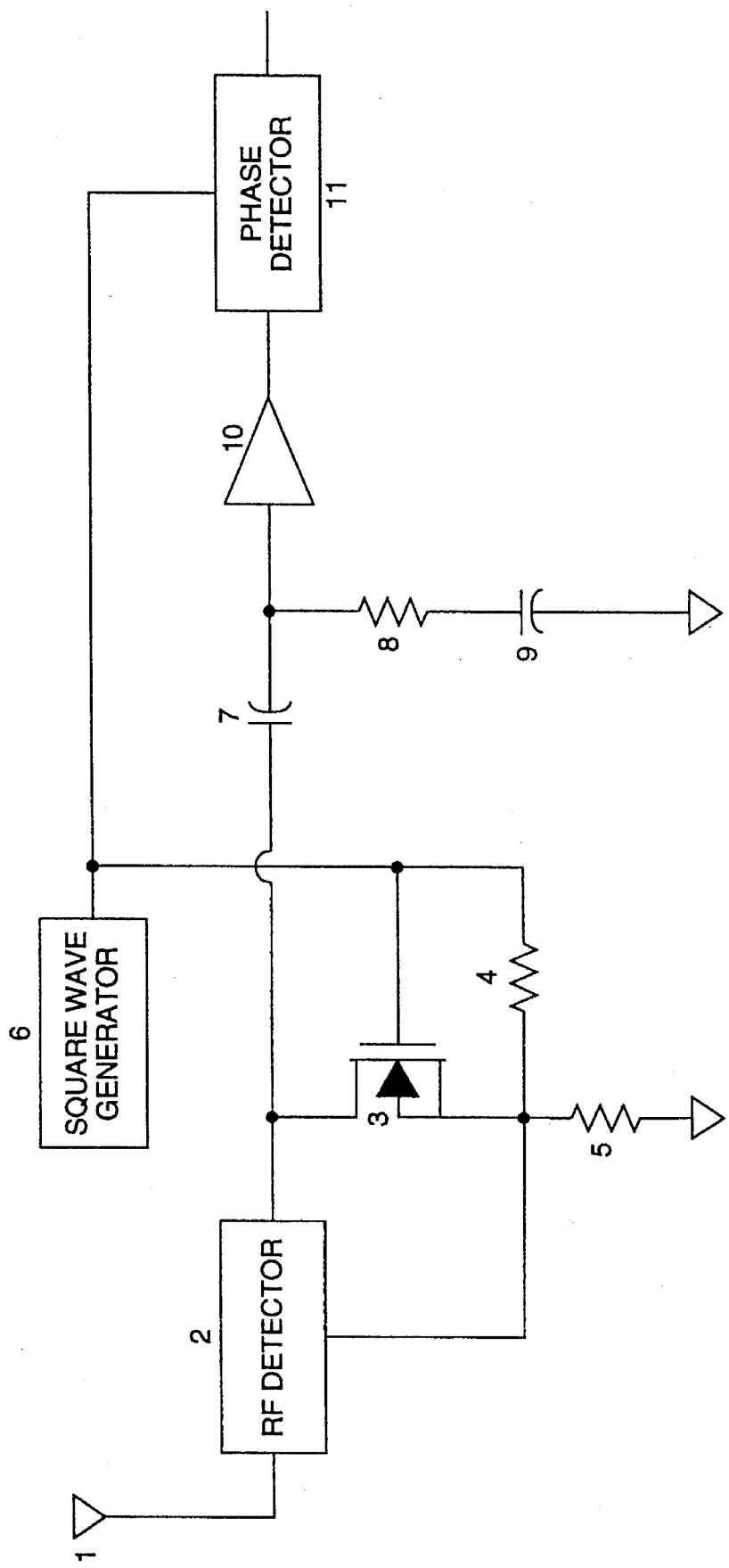
FIG. 1 is a schematic diagram of the invention.

Referring to FIG. 1, antenna 1 is used to receive the RF signal from the reader apparatus. RF detector 2 is a rectifier of a type well known in the art that converts the RF energy received through antenna 1 into a dc signal. Transistor 3 is an N-channel enhancement-mode field effect transistor (FET) which is used to "chop" the rectified RF dc signal to a square wave which has an amplitude proportional to that of the original dc signal voltage which in turn is proportional to the level of the received RF signal. By chopping the detected cw RF signal to "ac" (actually a square wave), the same amplifier may be used to amplify the RF activation signal and the "write data" signal (assuming the "write data" signal has a 50% duty cycle).

The signal generated by square wave generator 6 passes through the voltage divider formed by resistors 4 and 5, yielding a low level threshold reference voltage signal. This threshold reference voltage has the same frequency or shape as the chopped dc signal produced by transistor 3, but the two signals are of opposite polarity. The square wave generator can also be used to generate the coded backscatter modulation signal emitted in the "read" mode.

Threshold level detection is accomplished by comparing the chopped cw RF signal with the threshold reference voltage signal. The comparison is done by analog adding the two signals. Thus, when the threshold reference voltage signal is linearly combined with the chopped dc signal produced by transistor 3, the larger of the two signals determines the sense of the signal entering amplifier 10, thereby announcing whether the chopped detected cw RF signal has exceeded the threshold. Because the threshold amplitude comparison is done before the amplifier input, the amplifier gain does not affect the threshold level and therefore need not be precisely known or controlled.

Figure 2:
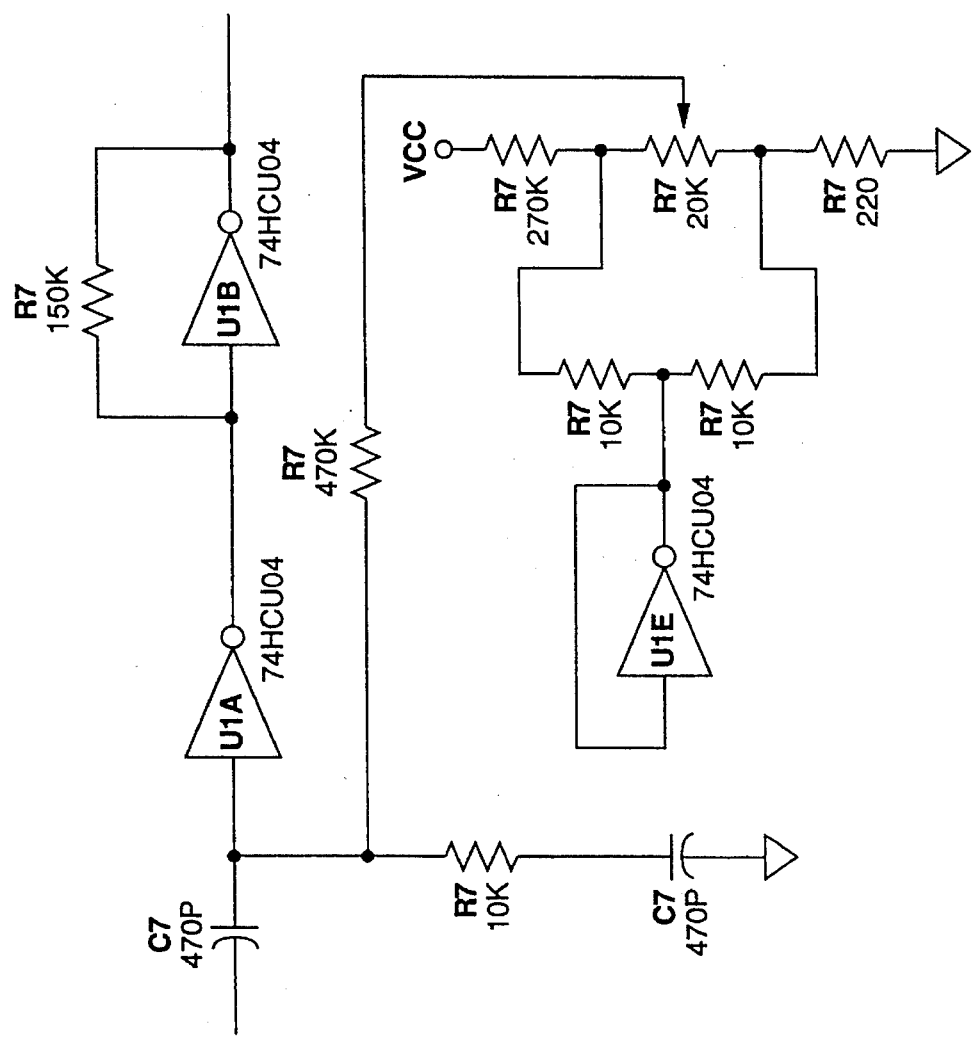
FIG. 2 is a schematic diagram of the ac-coupled limiting amplifier of a preferred embodiment of the invention.

Although the ac-coupled limiting amplifier 10 may be of any type, in the preferred embodiment of FIG. 2 the amplifier is implemented with cascaded CMOS inverter pairs with the input stage biased at the switching point to maximize ac gain, a design well known in the art. The CMOS inverter amplifier is used because it can be integrated into a CMOS tag ASIC and because of its speed of operation and low current consumption in a mixed signal CMOS ASIC.

As general purpose ac amplifiers these devices are not particularly attractive, but they do make excellent limiting amplifiers—i.e., the amplifier may be purposely driven into limiting or the region where, for example, a sinusoidal signal is purposely distorted and ends up as a square wave with steep sides and flat tops and bottoms. While the shape of the sine wave is gone, the timing of the zero crossings is retained. The resulting square wave can be used directly as an input to digital signal processing circuitry.

As noted above, because threshold comparison is accomplished before the signal is amplified, the gain of the amplifier does not affect the detection threshold level. This, in turn, makes it possible to use a limiting type of amplifier, which is much less complex and current-consuming than an amplifier with a fixed, known gain. The amplifier gain need only be large enough to fully limit and, near the threshold, provide an output that snaps quickly from one phase state to the other as the chopped signal amplitude changes.

Use of an ac-coupled limiting amplifier offers numerous advantages in the invention. First, the ac-coupled limiting amplifier is inexpensive to implement in CMOS circuitry and consumes much less current than a dc-coupled amplifier using differential amplifier stages of comparable speed. Second, unlike differential amplifiers, the ac-coupled limiting amplifier has no problem with dc offset voltage. Third, the limiting amplifier inherently produces a known amplitude at its output, which is far easier to work with than a variable output (from a variable input level) from a fixed-gain amplifier. Fourth, the limiting characteristic of the amplifier (it passes large signals without blocking and preserves the baseline crossing timing information of the signal) lets it handle a wide range of input signal amplitudes. The output waveshape for all ac input signals large enough to produce full limiting is a uniform amplitude square wave, which interfaces easily with subsequent logic, allowing the same amplifier to be used for amplifying the "write data" signal. Fifth, the ac coupling gives the tag the ability to ignore background cw RF signals and keep them from interfering with the reception of the reader's "write data" signal. Sixth, the limiting action of the amplifier gives the tag the ability to reject lower level modulated interfering signals, such as "write data" signals from other nearby tag readers.

Phase detector 11 receives the signal produced by amplifier 10 and compares it to the phase reference signal generated by square wave generator 6. Although this comparison may be accomplished in a number of ways, the preferred embodiment shown in FIG. 3 uses exclusive-OR gate 12 to produce a signal that is either "mostly yes" or "mostly no" (or mostly '1' or mostly '0' in binary). Because erroneous readings may result from glitches near the edges of the 16 kHz square wave caused by phase-shifts in the amplifier, a series of sampling pulses are generated near the middle of the 16 kHz square wave periods so they are as far away as possible from the edges of the square wave periods and therefore away from the times where the signal is noisy. The signal is sampled at these times and an output pulse is generated. The value of the output pulse indicates whether the input RF level was above or below the threshold reference level.

Figure 3:
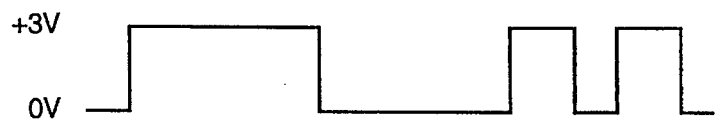
FIG. 3 depicts signal waveshapes given a detected 5 mV RF signal and a 10 mV reference signal.
Figure 3:
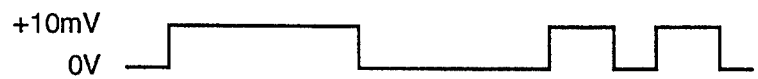
Figure 3:
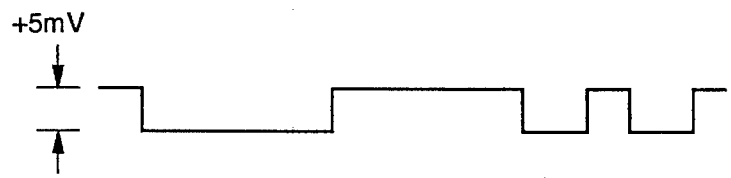
Figure 3:
Figure 3:
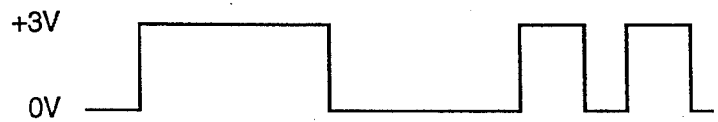
Figure 3:
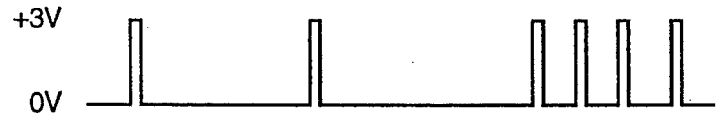
Figure 3:
Figure 4:
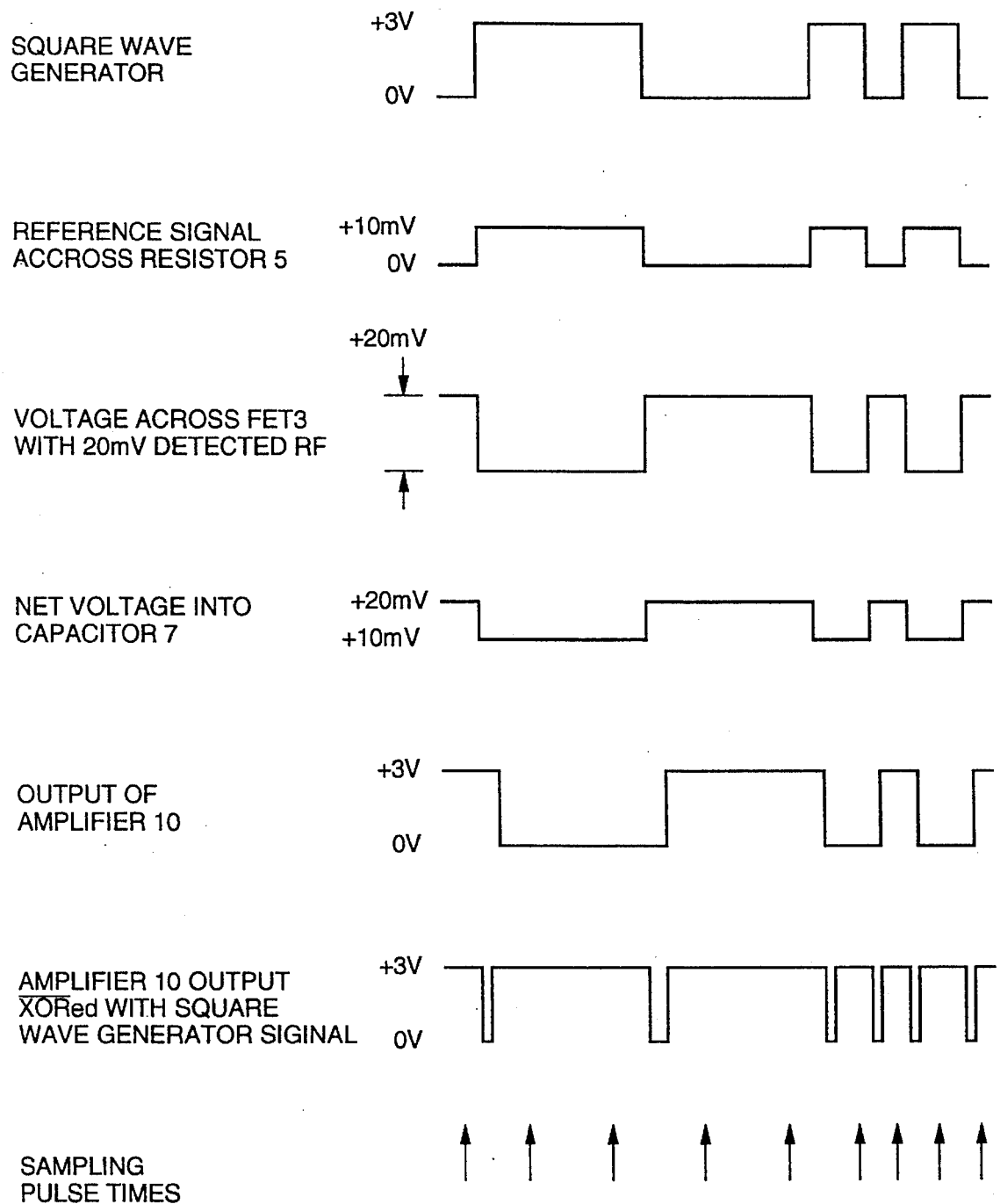
FIG. 4 depicts signal waveshapes given a detected 20 mV RF signal and a 10 mV reference signal.

By way of example of a preferred embodiment, FIGS. 3 and 4 depict the waveshapes produced by the invention using a 10 mV threshold reference signal. In FIG. 3, the system detects a 5 mY RF signal, less than the 10 mV threshold reference signal. In FIG. 4, the system detects a 20 mV signal, greater than the 10 mV threshold reference signal. Waveshapes 12 and 18 depict the output of the square wave generator 6 in FIG. 1. The coded signal may be, as here, composed of two different square wave frequencies. Waveshapes 13 and 19 depict the reference signal across resistor 5. This signal is referenced to "ground", or zero volts, and swings between 0 and +10 mV. Waveshapes 14 and 20 depict the detected RF signal "chopped" by transistor 3, an FET, which has an "ON-resistance" much smaller than the output impedance of RF Detector 2. Therefore, when the FET is turned ON by its gate being driven to +V by the output of square wave generator 6, the detected RF signal voltage is pulled down to essentially zero volts. Waveshapes 15 and 21 depict the algebraic sum of the signal voltages across resistor 5 and FET 3, which together combine to form the signal entering capacitor 7. waveshapes 16 and 22 depict the output of limiting amplifier 10 where the input has been amplified to tag logic level. For the sake of completeness, waveshapes 16 and 22 depict a slight "phase shift" or "propagation delay" from input to output that such amplifiers may cause. The final waveshapes 17 and 23 depict the result of an inverted XORing of the amplifier output signal with the phase reference signal from the square wave generator 6. The short pulses result from the presumed propagation delay in amplifier 10.

Figure 5:
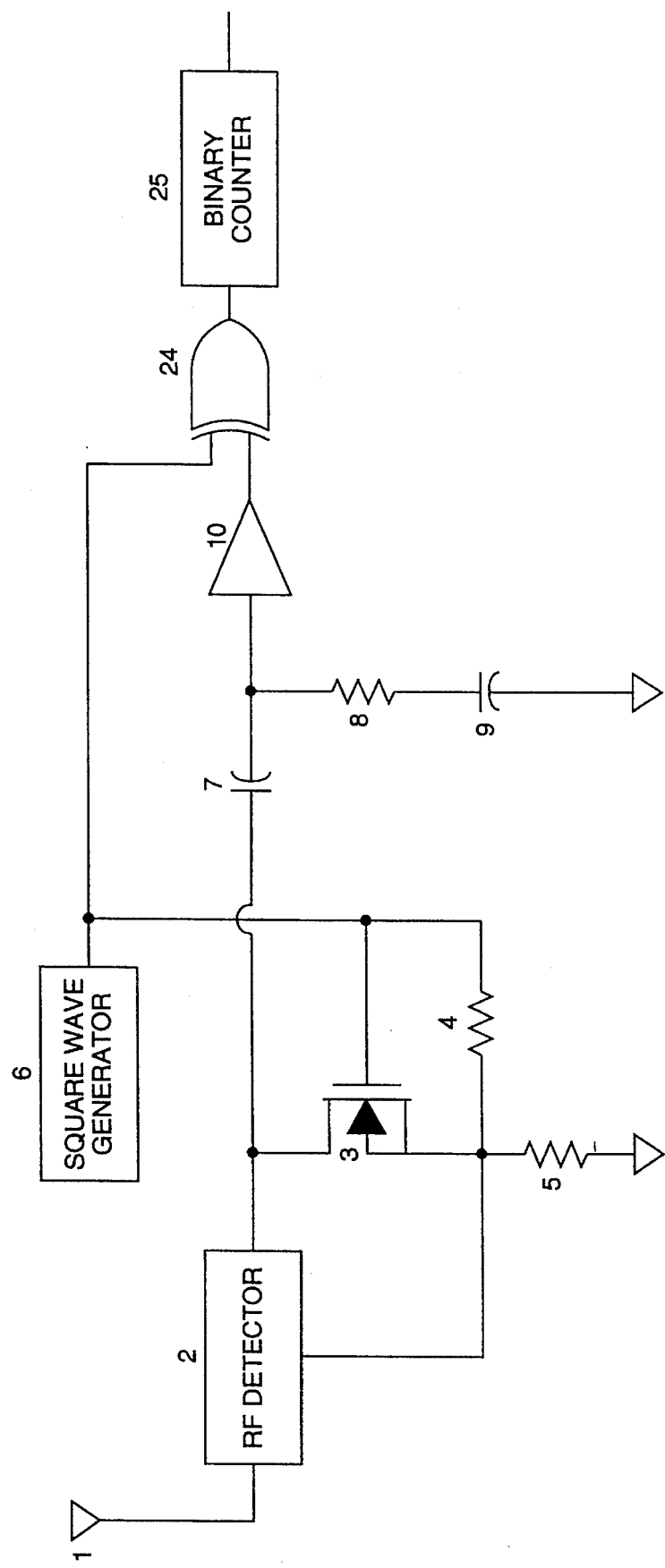
FIG. 5 is a schematic diagram of the preferred embodiment of the invention.
Figure 3:
Figure 3:
Figure 3:
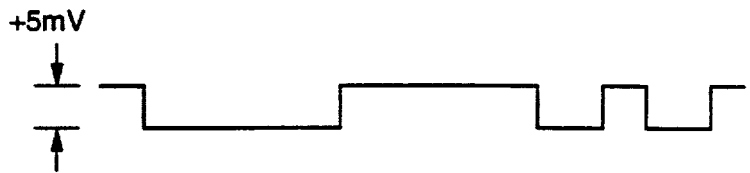
Figure 3:
Figure 3:
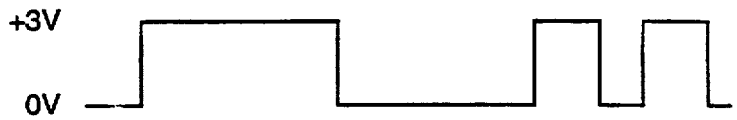
Figure 3:
Figure 3:
Figure 4:
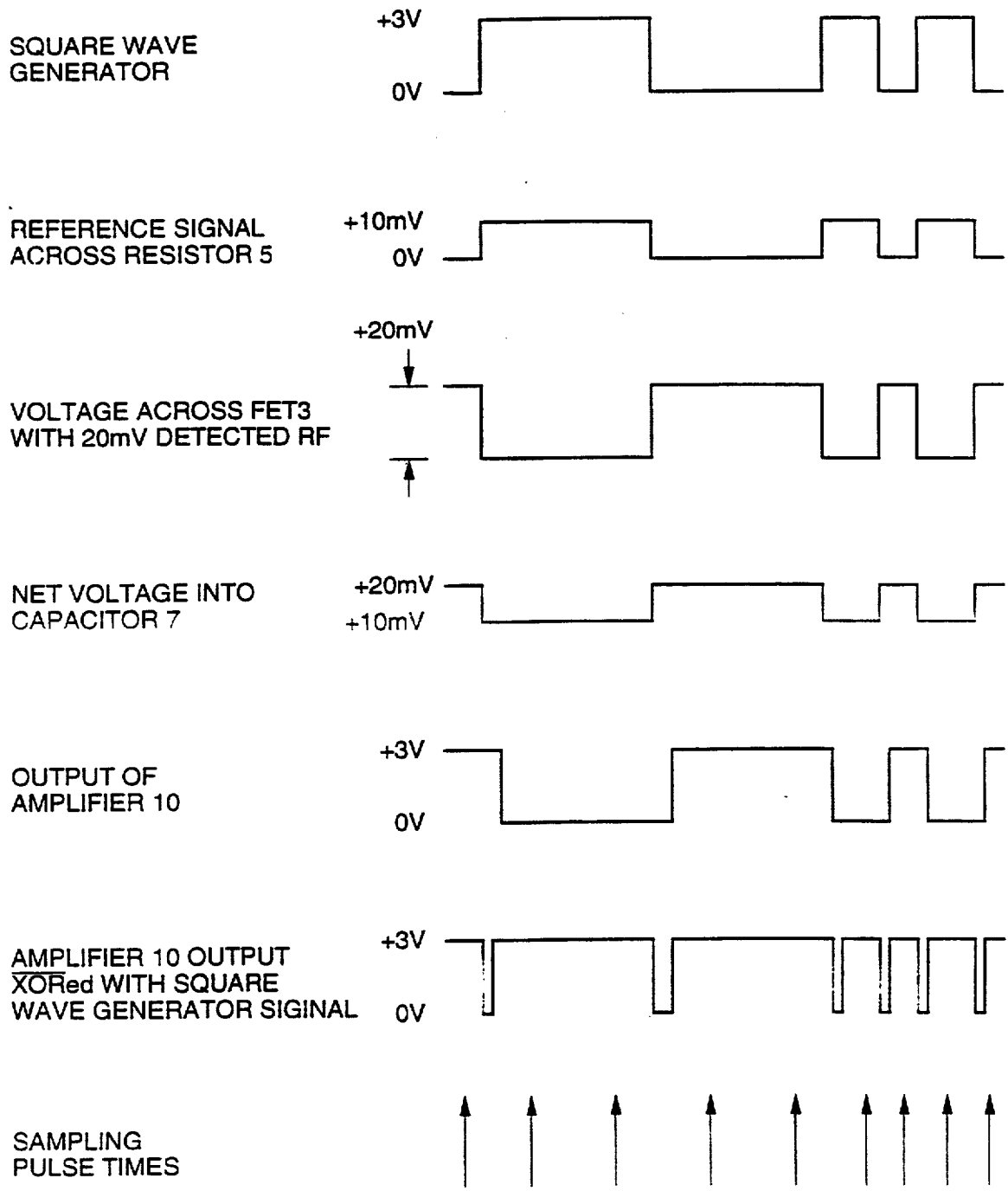

In the preferred embodiment of FIG. 5, the output of exclusive-or gate 24 is passed through additional logic circuitry to improve the invention's ability to distinguish between RF from a reader and cw RF from other sources, such as cellular telephones or mobile communications, and to ensure that momentary accidental or random noise signals in the RF background are not mistaken for genuine cw RF, as would be received from a tag reader. In this embodiment, binary counter 25 is used to make the decision as to whether the input RF level had definitely exceeded the threshold for a sufficient time. Whenever an "above threshold" pulses occurs, the counter increments by one. Whenever a "below threshold" pulse occurs, the counter is reset to zero. The number of stages used in the binary counter determines the number of successive "above threshold" pulses that must occur before the tag circuitry will be activated. For example, if a four-stage binary counter is used, then it will take eight successive "above threshold" pulses before the fourth stage of the counter is activated and its output changes from a logical 0 to a logical 1. When the output of the final stage of the counter is a logical 1, the tag "wake-up" sequence is triggered.

Because any "below threshold" pulse will reset the counter, this makes it very unlikely that an accidental combination of noise RF pulses will mimic a cw RF level and spuriously trigger the tag into "wake-up." When the input RF level is below the threshold reference voltage level, the output of the comparison circuitry is not random, but a continuous stream of "below threshold" pulses, which continually "reset" the counter. This ability to reject interfering RF signals is an improvement over known alternative implementations. The added circuitry and current consumption is almost trivial in an ASIC.

As will be understood by those skilled in the art, many changes in the apparatus and methods described above may be made by the skilled practitioner without departing from the spirit and scope of the invention, which should be limited only as set forth in the claims which follow.

I claim:

1. A circuit for selectively activating RF equipment upon detection of an RF activation signal, comprising:

a means for receiving the activation signal to be detected;

an RF detector operatively connected to the receiving means;

a means for supplying a threshold reference level signal;

a converting means operatively connected to the RF detector for converting the output of the RF detector from a dc voltage signal to a square wave signal having a polarity opposite that of the threshold reference level signal;

an ac-coupled limiting amplifier having as its input the combined output of the converting means and the signal from the threshold reference supply; and a means for detecting the phase of the amplifier output and comparing it to the phase of the threshold reference level signal, and activating the RF equipment when the phase of the amplifier output is opposite the phase of the threshold reference level signal.

2. The circuit for selectively activating RF equipment upon detection of an RF activation signal of claim 1 in which the means for supplying a threshold reference level signal is a square wave generator.

3. The circuit for selectively activating RF equipment upon detection of an RF activation signal of claim 2 in which the means for supplying a threshold reference level signal also supplies a backscatter modulation signal.

4. The circuit for selectively activating RF equipment upon detection of an RF activation signal of claim 1 in which the converting means is an N-channel enhancement-mode field effect transistor operatively connected to the means for supplying a threshold reference level signal.

5. The circuit for selectively activating RF equipment upon detection of an RF activation signal of claim 1 in which the ac-coupled limiting amplifier is made up of cascaded CMOS inverter pairs, and the amplifier has its input stage biased at the switching point.

6. The circuit for selectively activating RF equipment upon detection of an RF activation signal of claim 1 in which the phase detecting means is an exclusive-or gate.

7. The circuit for selectively activating RF equipment upon detection of an RF activation signal of claim 1, further comprising:

a distinguishing means operatively connected to the phase detecting means for distinguishing the activation signal from other intermittent RF energy.

8. The circuit for selectively activating RF equipment upon detection of an RF signal of claim 7 in which the distinguishing means is a binary counter having as an input the output of the phase detecting means.

* * * * *

UNITED STATES PATENT AND TRADEMARK OFFICE
CERTIFICATE OF CORRECTION

PATENT NO. : 5,479,160            Page 1 of 3
DATED : December 26, 1995
INVENTOR(S) : Alfred R. Koelle It is certified that error appears in the above-indentified patent and that said Letters Patent is hereby corrected as shown below:

| COLUMN | LINE | |
|---|---|---|
| 4 | 49 | "mY" should read --mV-- |
| 4 | 61 | "≠V" should read --+3V-- |
| 4 | 66 | "waveshapes" should read --Waveshapes-- |
| 5 | 19 | "pulses" should read --pulse-- |

In the drawings, delete Figures 3 and 4, to be substituted with the attached Figures.

Signed and Sealed this

Second Day of July, 1996

Attest:

BRUCE LEHMAN

Attesting Officer      Commissioner of Patents and Trademarks

SQUARE WAVE GENERATOR  +3V / 0V

REFERENCE SIGNAL ACROSS RESISTOR 5  +10mV / 0V

VOLTAGE ACROSS FET3 WITH 5mV DETECTED RF  +5mV

NET VOLTAGE INTO CAPACITOR 7  +10mV / +5mV

OUTPUT OF AMPLIFIER 10  +3V / 0V

AMPLIFIER 10 OUTPUT $\overline{XOR}$ed WITH SQUARE WAVE GENERATOR SIGNAL  +3V / 0V

SAMPLING PULSE TIMES

SIGNAL WAVE SHAPES WITH DETECTED RF OF 5mV, SMALLER THAN THE 10mV REFERENCE SIGNAL.

SIGNAL WAVE SHAPES WITH DETECTED RF OF 20mV, LARGER THAN THE 10mV REFERENCE SIGNAL.